United States Patent
Kabuto et al.

(10) Patent No.: US 8,493,511 B2
(45) Date of Patent: Jul. 23, 2013

(54) DISPLAY SYSTEM, DISPLAY DEVICE, AND REPEATER

(75) Inventors: Nobuaki Kabuto, Kunitachi (JP); Yohei Kato, Fujisawa (JP); Toyoshige Ohshika, Fujisawa (JP); Tatsuya Okamura, Hitachinaka (JP); Kazuma Ueno, Yamato (JP)

(73) Assignee: Hitachi Consumer Electronics Co., Ltd., Tokyo (JP)

(*) Notice: Subject to any disclaimer, the term of this patent is extended or adjusted under 35 U.S.C. 154(b) by 104 days.

(21) Appl. No.: 13/163,060

(22) Filed: Jun. 17, 2011

(65) Prior Publication Data
US 2012/0057075 A1 Mar. 8, 2012

(30) Foreign Application Priority Data
Sep. 6, 2010 (JP) .................................. 2010-198460

(51) Int. Cl.
*H04N 5/445* (2011.01)

(52) U.S. Cl.
USPC ............................. 348/564; 348/552; 348/565

(58) Field of Classification Search
USPC ......... 348/563–565, 569, 552, 725, 561–568, 348/581, 723; 701/2, 8, 23, 31
IPC ........................................................ H04N 5/445
See application file for complete search history.

(56) References Cited

U.S. PATENT DOCUMENTS

| | | | |
|---|---|---|---|
| 7,948,561 B2 * | 5/2011 | Yun et al. | 348/565 |
| 7,979,591 B2 * | 7/2011 | Lida et al. | 710/2 |

FOREIGN PATENT DOCUMENTS

| | | | |
|---|---|---|---|
| JP | 2008-109342 | | 5/2008 |
| JP | 2008-109342 A | | 5/2008 |
| JP | 2008-109342 | * | 8/2008 |
| JP | 2010-102053 | | 5/2010 |

* cited by examiner

*Primary Examiner* — Trang U Tran
(74) *Attorney, Agent, or Firm* — McDermott Will & Emery LLP

(57) ABSTRACT

Also in a video system in which a device responding to a multiple screen display function and a non-responding device are mixedly present, a communication message for a collaboration of the device which performs a multiple screen display operation is realized without exerting an influence on operations of the non-responding device. A video device including two or more video input ports and capable of simultaneously receiving videos output from multiple video source devices connected to the video input ports is configured so as to perform a predetermined filtering operation or message conversion when transmitting to the other video input ports a communication message for video device control to be converted through the video input ports.

4 Claims, 17 Drawing Sheets

FIG.10

| Opcode | Parameters | Parameter description | Response |
|---|---|---|---|
| <Routing Information> | [Physical Address] [Multi] | Video and Audio from the device of [Physical Address] is being transmitted as [Multi] structure | |
| <Set Stream Path> | [Physical Address] [Multi] | Request Video and Audio from the device of [Physical Address] as [Multi] structure | <Routing Information> or <Active Source> |

FIG.11

| Name | Range Description | | Length | Purpose |
|---|---|---|---|---|
| [Multi] | [Position][Layout] [3D format][Audio mix] | | 2byte | |
| [Position] | "Picture Position" | 0-7 | 4 bit | REFER TO FIG. 12 |
| | "Audio only" | 8 | | Black picture or other video source is transmitted |
| | Reserved | 9-15 | | |
| [Layout] | "1 picture" | 0 | 3 bits | REFER TO FIG. 12 |
| | "Horizontal 2 pictures" | 1 | | |
| | "Vertical 2 pictures" | 2 | | |
| | "Picture in Picture" | 3-6 | | |
| | "4 pictures" | 7 | | |
| [3D format] | "Normal" | 0 | 1 bit | Transmit multi 2D picture on 2D format or multi 3D picture on 3D format |
| | "Multi 2D on 3D format" | 1 | | Transmit multi 2D video using 3D video format |
| [Audio mix] | "This channel" | 0 | 2 bit | Audio on other video is stopped |
| | "Mixing" | 1 | | Mixing with this audio is transmitted |
| | "Another channel" | 2 | | No audio on this video is transmitted |
| | "Multi Audio" | 3 | | All multi audio is transmitted by LPCM |
| | Reserved | 0 | 6 bit | |

FIG.20

| VIDEO DEVICE | CEC NETWORK 701 | | | | CEC NETWORK 702 | | | |
|---|---|---|---|---|---|---|---|---|
| | PHYSICAL ADDRESS | | LOGICAL ADDRESS | | PHYSICAL ADDRESS | | LOGICAL ADDRESS | |
| | SUBSTANTIAL | VISUAL | SUBSTANTIAL | VISUAL | SUBSTANTIAL | VISUAL | SUBSTANTIAL | VISUAL |
| DISPLAY DEVICE 40 | [0000] | SAME AS ON THE LEFT | "0" TV | SAME AS ON THE LEFT | — | [0000] | — | "0" TV |
| SOURCE DEVICE 13 | [2000] | SAME AS ON THE LEFT | "4" Playback 1 | SAME AS ON THE LEFT | — | [0000] | — | "0" TV |
| DISPLAY DEVICE 43 | [1000] | SAME AS ON THE LEFT | "14" Special use | SAME AS ON THE LEFT | — | [0000] | — | "0" TV |
| AUDIO AMPLIFIER 22 | — | [1000] | — | "14" Special use | [0000] | SAME AS ON THE LEFT | "0" TV | SAME AS ON THE LEFT |
| SOURCE DEVICE 11 | — | [1100] | — | "5" Audio System | [1000] | SAME AS ON THE LEFT | "5" Audio System | SAME AS ON THE LEFT |
| SOURCE DEVICE 12 | — | [1110] | — | "8" Playback 2 | [1100] | SAME AS ON THE LEFT | "4" Playback 1 | SAME AS ON THE LEFT |
| SOURCE DEVICE 12 | — | [1120] | — | "11" Playback 3 | [1200] | SAME AS ON THE LEFT | "8" Playback 2 | SAME AS ON THE LEFT |
| SOURCE DEVICE 14 | — | [1200] | — | "15" Unregistered | [2000] | SAME AS ON THE LEFT | "11" Playback 3 | SAME AS ON THE LEFT |

DISPLAY SYSTEM, DISPLAY DEVICE, AND REPEATER

INCORPORATION BY REFERENCE

The present application claims priority from Japanese application JP2010-198460 filed on Sep. 6, 2010, the content of which is hereby incorporated by reference into this application.

BACKGROUND OF THE INVENTION

The present invention relates to transmission and reception of a video signal.

As an interface for transmitting a video signal from a source device to a display device, a High-Definition Multimedia Interface (HDMI. A trademark of HDMI, LLC) is widely used. Further, a collaboration operation between a source device and a display device is realized based on a control communication such as Consumer Electronics Control (CEC) included in the HDMI.

In JP-A-2008-109342, the following technique is disclosed. A display device is provided with an HDMI input port. External equipment including an Nil output port can be directly connected to the HDMI input port by an HDMI cable. Further, external equipment can be connected to the display device also through relay external equipment including HDMI input and output ports. The display device includes a multiple screen display control means for performing control for simultaneously displaying each of the input images from two or more input sources on a screen and a command detection means for detecting a prescribed screen start command showing the output of the setting screen image of the external equipment transmitted by using a CEC command based on an HDMI specification from the external equipment connected to the display device. The multiple screen display control means performs control for additionally displaying the setting screen image output from the external equipment on a sub-screen when detecting the screen start command by the command detection means. In addition, an AV amplifier 2 combines videos into a two-screen mode and outputs it to a television device 1.

Also, in JP-A-2010-102053, the following technique is disclosed. It is an object of the present invention to provide a video generation device and a video display device capable of displaying the videos of two screens which make a video already displayed in a video display device, such as a broadcasting signal as a main-screen image and a video newly generated in the external part as a sub-screen video, on a one-screen with automatically and optically designed layout, without changing the structure of the inner part of a display device. Further, as a layout command of specifying each display position (coordinate value of upper left) of a main-screen video and a sub-screen video and a display size, a command of switching an input over to a terminal to which a command referred to <active source> in an HDMICEC is input is used, and further is expanded as in FIG. 3.

SUMMARY OF THE INVENTION

However, in the above-described prior art documents, the control of using an existing command specified by the HDMI is not taken into consideration. As a result, the devices disclosed in the above-described prior art documents are hard to be used in an existing system, and therefore, are not user-friendly.

To solve the above-described problem, for example, a configuration described in a patent claim is adopted.

According to an aspect of the present invention, there is provided a display system. This display system includes a first source device to output a first video signal; a second source device to output a second video signal; and a display device connected to the first and second source devices, wherein at a time when the display device displays the first video signal, when a message for starting an output of the second video signal is transmitted from the second source device to the display device, the display device displays the first and second video signals; and when changing from one state of displaying the first and second video signals to another state of displaying the second video signal, the display device transfers to the first source device a message for starting the output of the second video signal received from the second source device.

According to the above-described method, display of multiple videos can be realized by using an existing system, and user-friendly devices can be provided.

Other objects, features and advantages of the invention will become apparent from the following description of the embodiments of the invention taken in conjunction with the accompanying drawings.

BRIEF DESCRIPTION OF THE DRAWINGS

FIG. 10 is a table illustrating one example of the message in the video transmission system:

FIG. 11 is a table illustrating one example of an argument of the message in the video transmission system;

FIG. 20 is a table illustrating one example of addresses of video devices in the video transmission system.

DESCRIPTION OF THE EMBODIMENTS

Embodiments of the present invention will be described below.

First Embodiment

Figure 1:
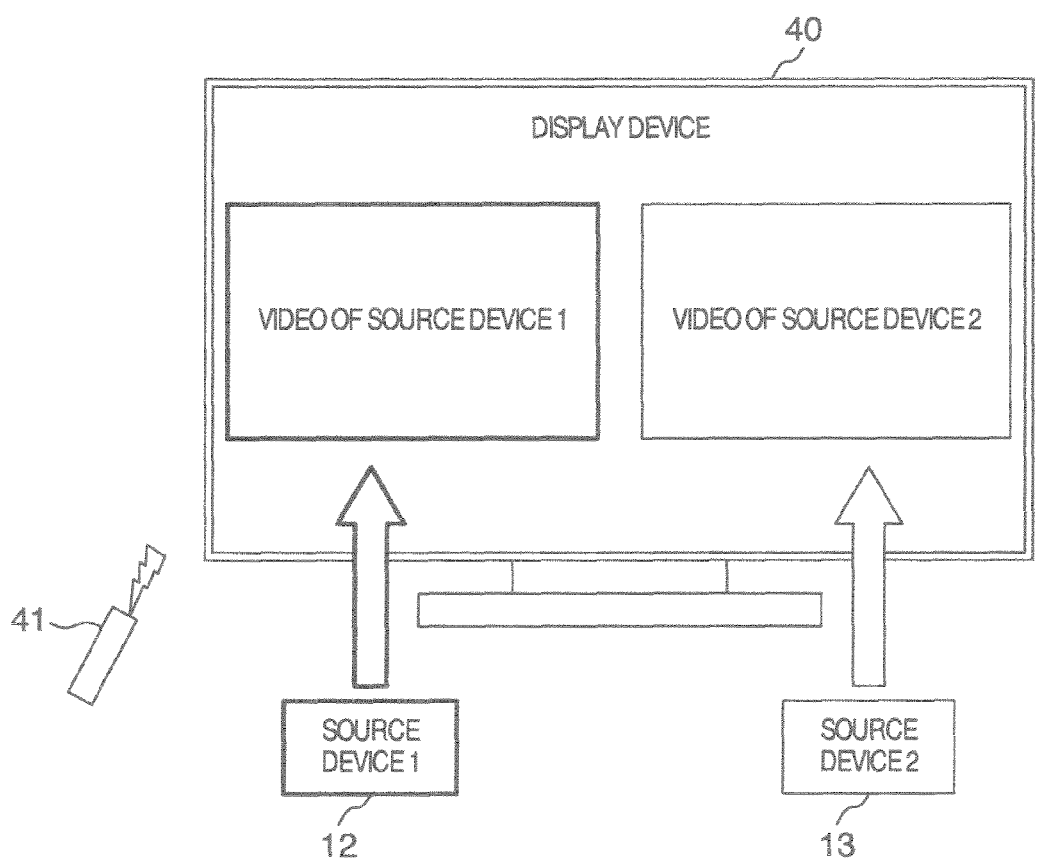
FIG. 1 is a block diagram illustrating one example where a display device displays a two-screen mode of videos from two source devices.

FIG. 1 is an example where two video signals output two source devices 12 and 13 are displayed on two screens by using a display device 40. A remote control 41 is an input tool for controlling the display device or source devices and inputting an instruction by a user.

Figure 2:
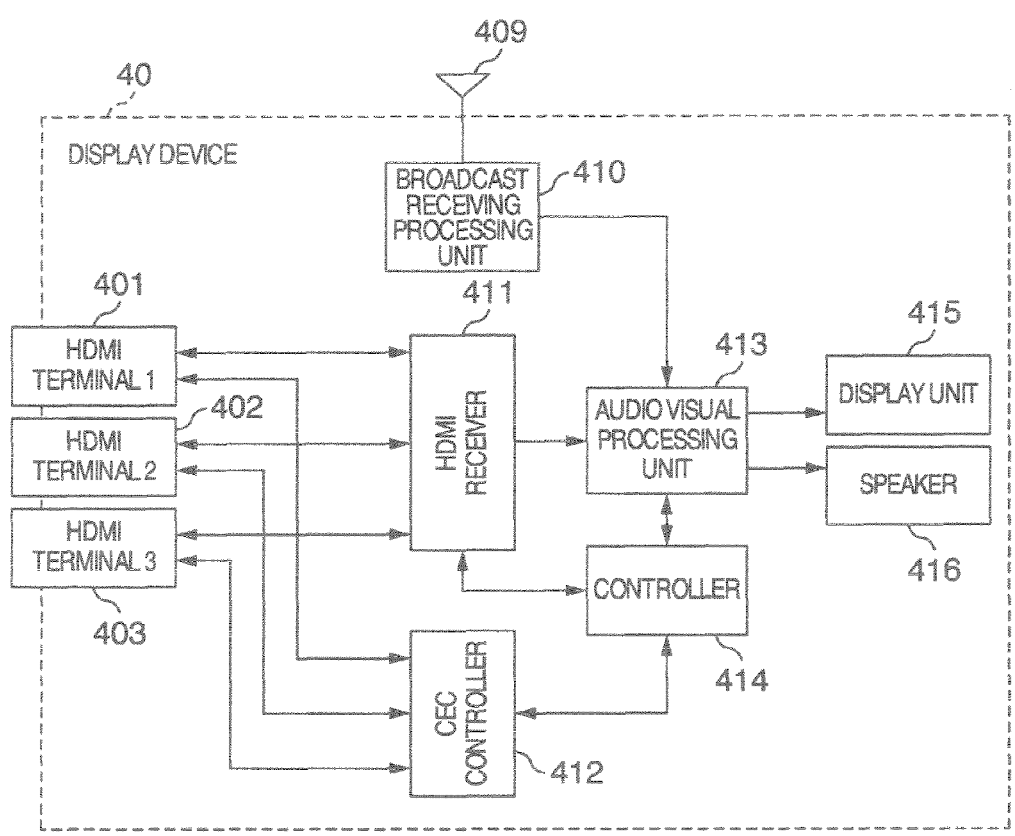
FIG. 2 is a block diagram illustrating a configuration example of the display device.

FIG. 2 is a block diagram illustrating a configuration example of the display device 40 illustrated in FIG. 1. An electric wave of television broadcasting received by a broadcast receiving antenna 409 is supplied to a broadcast receiving processing unit 410, and a broadcast signal of a channel desired by the user is extracted. Further, the broadcast signal is frequency-converted into a predetermined frequency band and is demodulated so as to release a modulation process performed for transmission on the broadcast station side.

In the case of digital broadcasting, two or more contents are time-division multiplexed into one broadcast channel in many cases. Further, the broadcast receiving processing unit 410 performs a predetermined process such as a demultiplexing process for selecting contents desired by the user.

An output signal from the broadcast receiving processing unit 410 is supplied to an audio visual processing unit 413. Here, the broadcast receiving processing unit 410 may perform simultaneous decoding processing of two or more contents time-division multiplexed or simultaneous demodulation of two or more broadcast channels to supply an output signal of the two or more contents to the audio visual processing unit 413 at the same time.

On the other hand, an HDMI receiver 411 decodes video signals produced from the source devices (not illustrated) connected to two or more video input ports such as HDMI terminals 401, 402, and 403, and supplies them to the audio visual processing unit 413. The HDMI receiver 411 has a function of supplying two or more video signals to the audio visual processing unit 413 at the same time.

The audio visual processing unit 413 selects output signals from the broadcast receiving processing unit 410 and the HDMI receiver 411, or combines multiple screens. At the same time, if necessary, the audio visual processing unit 413 supplies to a display unit 415 the video signal to which a high definition process is performed, and the display unit 415 displays videos. Further, the audio visual processing unit 413 supplies an audio signal added to the supplied video signal to a speaker 416, and the speaker 416 reproduces a voice.

A CEC controller 412 exchanges messages for performing a collaboration operation with the source devices (not illustrated) connected to the HDMI terminals 401, 402, and 403 through CEC lines within HDMI cables. In the HDMI specifications, the CEC lines the same video system are commonly-connected; further, the display device having a physical address of [0000] causes the CEC line of each HDMI terminal to go independent.

In an usual video system with CEC, only one source device is allowed to output a video signal. When each CEC line that connect to each HDMI terminal is not connected in the display device, each HDMI terminal can control each source device independently. Therefore, video signals from two or more source devices are simultaneously received by the HDMI receiver 411, and videos are combined by the audio visual processing unit 413, thereby realizing a two-screen display mode as illustrated in FIG. 1 by using the display unit 415. In addition, the controller 414 controls all of these operations of the display device 40.

As can be seen from the above sequence, when the CEC lines are caused to go independent, two or more video signals and audio signals can be simultaneously received to realize a multiple-screen display mode. In addition, two or more audio amplifiers can be connected to individually perform a collaboration operation; however, in the HDMI video system, only one audio amplifier is allowed to be connected. However, when messages fail to be exchanged between the independent CEC lines, the collaboration operation between the video devices is considered to be disturbed.

Figure 3:
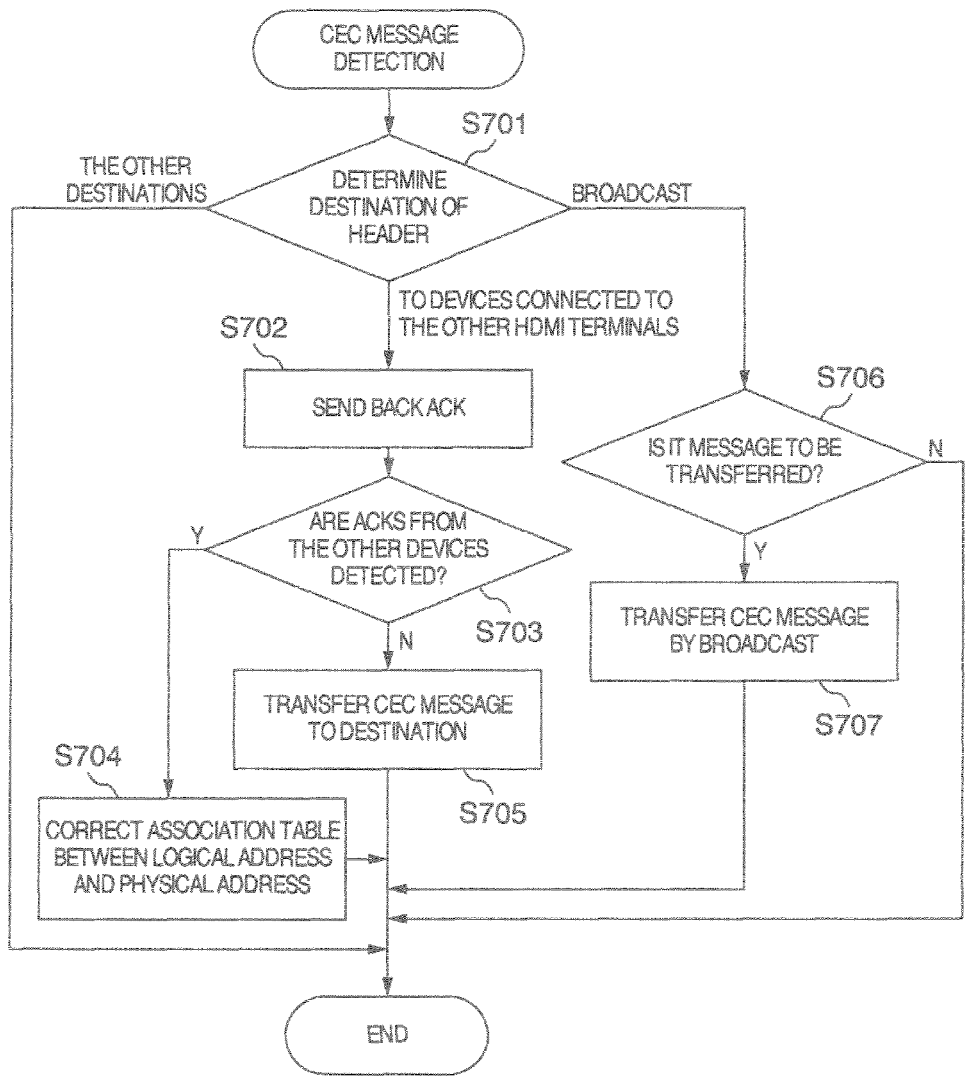
FIG. 3 is a flowchart illustrating one example of a process in a video transmission system.

To cope with the above problem the CEC controller 412 may transfer messages by a procedure as illustrated in a flowchart of FIG. 3. This is referred to as a filtering process. Hereinafter, each step of this filtering process will be described according to the flowchart.

(S701) To source devices (not illustrated) connected to each of the HDMI terminals 401, 402, and 403, the physical addresses of [1000], [2000], and [3000] are given, respectively, according to specifications determined in the HDMI. When each source device is further connected to other source devices, the physical address of [1xxx] [2xxx] and [3xxx] are given to them, respectively. When viewing a first figure of the physical address, which source device is connected to which HDMI terminal can be distinguished.

On the other hand, in a header of the CEC message, a logical address of 4-bit is written as a destination, and an association table between the logical address and the physical address is previously stored. Therefore, this permits the CEC controller 412 to determine which message is transferred to a device connected to which HDMI terminal.

When the message is transferred to a device connected to another HDMI terminal different from the received HDMI terminal, the process proceeds to step S702.

The CEC message is treated as a broadcast message when it is a message (e.g., having the logical address of "F") to all the devices connected through the HDMI terminal, and the process then proceeds to step S706.

When the CEC message is a message to a device (including its own device) connected to the received HDMI terminal, or a message a destination of which is not included in the association table, the CEC controller 412 determines that it is a message to the other destinations, and then this filtering process ends. When its own device is used as a destination, this filtering process ends. Then, ACK (ACKnowledge, an affirmative message transmitted to a transmission source from a transmission destination of the data) for transmission confirmation is sent back as the original CEC reception process, and a predetermined response operation is performed.

(S702) Judging from a header, when the CEC message is a message to a device connected to another HDMI terminal, ACK is sent back in place of the destination device.

(S703) When the ACK can be normally sent back by proxy and the ACKs from other devices fail to be detected, the process proceeds to step S705. On the other hand, when the ACK responses from other devices are detected, the association table between the logical address and the physical address is considered to be wrong. Therefore, the CEC controller 412 cancels an ACK replay, and the process proceeds to step S704.

(S704) After the CEC controller 412 deletes the relevant logical address from the association table, this filtering process ends. Before deleting the logical address, a polling message is sent to the logical address. After whether devices having different physical addresses respond by the same logical address is confirmed, the logical address may be deleted. If the ACKs are confirmed from both of the devices connected to the different HDMI terminals by the same logical address, the logical address is double registered. Therefore, the logical address of either one of the two devices is changed. Alternatively, new logical addresses are acquired by proxy by the HDMI terminals, respectively, and they may be added to the above-described conversion table including conversion to the new logical address.

(S705) The CEC controller 412 transfers the CEC message to the CEC line of the HDMI terminal to which the destination device is connected, and the process ends. When an ACK fails to be sent back during the message transfer, the CEC controller 412 may determine that the device leaves a video system and delete it from among the association table between the logical address and the physical address. Before deleting the device from the above-described table, the CEC controller 412 may send a polling message to it, and again confirm whether it is present. Then, the CEC controller 412 may delete the device from the association table.

(S706) When determining based on the header that the CEC message is a broadcast message, the CEC controller 412 determines based on a subsequent operation code whether the CEC message is a message to be transferred. If the CEC message is transferred, the process proceeds to step S707. If the CEC message is not required to be transferred, the filtering process ends. If the multiple-screen display mode is not performed, all the CEC messages are to be transferred. If the multiple-screen display mode is performed, the CEC controller 412 stop to transfer the CEC message to the HDMI terminal in which a message on a transmission route change of video signals, such as <Active Source>, <Routing Information>, <Routing Change>, and <Set Stream Path> is selected as an input source of the multiple-screen display mode.

The reason is that the source device during providing a video for the multiple-screen display mode is prevented from stopping a video signal. An influence is not exerted on the multiple-screen display mode with respect to the source device which fails to provide a video for the multiple-screen display mode, and therefore, the CEC controller 412 may transfer the CEC message to it.

(S707) By using broadcast, the CEC controller 412 transfers the CEC message to the devices connected to the other HDMI terminals, and the filtering process ends.

According to the above-described process, without defining a new CEC message, while a device having two or more HDMI terminals such as the display device maintains an HDMI network for CEC control including the source devices connected to the two or more HDMI terminals, a video transmission system can actively supply a video signal to two or more source devices at the same time, and display videos of them by using the display device at the same time.

Second Embodiment

Figure 4:
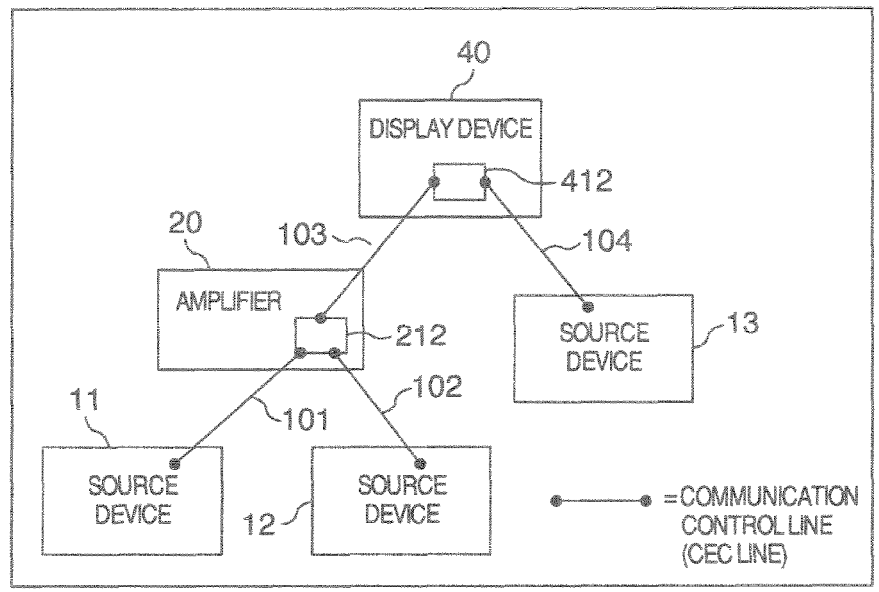
FIG. 4 is a block diagram illustrating a connection example of a control communication line in the video transmission system.

FIG. 4 is a block diagram illustrating a connection example of a control communication line of the video transmission system according to the present embodiment. Source devices 11 and 12 are connected to the display device 40 through an audio amplifier 20 as a repeater, and a source device 13 is connected to the display device 40 through a video interface such as an HDMI cable.

In the present embodiment, control communication lines (CEC lines) 101 and 102, and 103 and 104 included in the HDMI cables are connected through a CEC controller 212 and the CEC controller 412, respectively. Examples of the source devices 11, 12, and 13 include a DVD player, a DVD recorder, a Blu-ray Disc player, a Blu-ray Disc recorder, an HDD recorder, a broadcast reception set top-box, and a media tuner.

Figure 5:
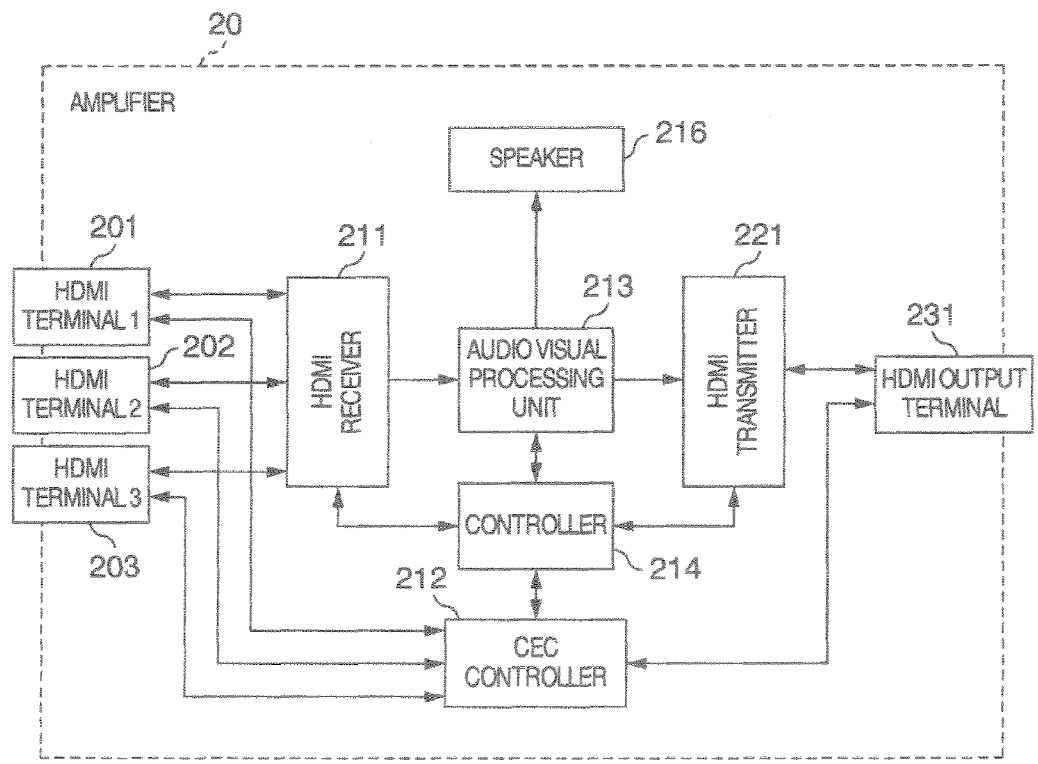
FIG. 5 is a block diagram illustrating a configuration example of an audio amplifier.

FIG. 5 is a block diagram illustrating a configuration example of the audio amplifier 20 illustrated in FIG. 4. An HDMI receiver 211 decodes a video signal produced from source devices (not illustrated) connected to two or more video input ports such as HDMI terminals 201, 202, and 203, and supplies the decoded video signal to an audio visual processing unit 213. The HDMI receiver 211 has a function of supplying two or more video signals to the audio visual processing unit 213 at the same time.

The audio visual processing unit 213 selects an input signal of the HDMI receiver 211 or combines selected plural input signals (e.g., combines video signals supplied to HDMI terminals 1 and 2) to supply to an HDMI transmitter 221. At the same time, the audio visual processing unit 213 supplies an audio signal added to the supplied video signal to a speaker 216, and the speaker 216 reproduces a voice. The HDMI transmitter 221 outputs a signal output from the audio visual processing unit 213 to the display unit (not illustrated) through an HDMI output port 231.

Figure 6:
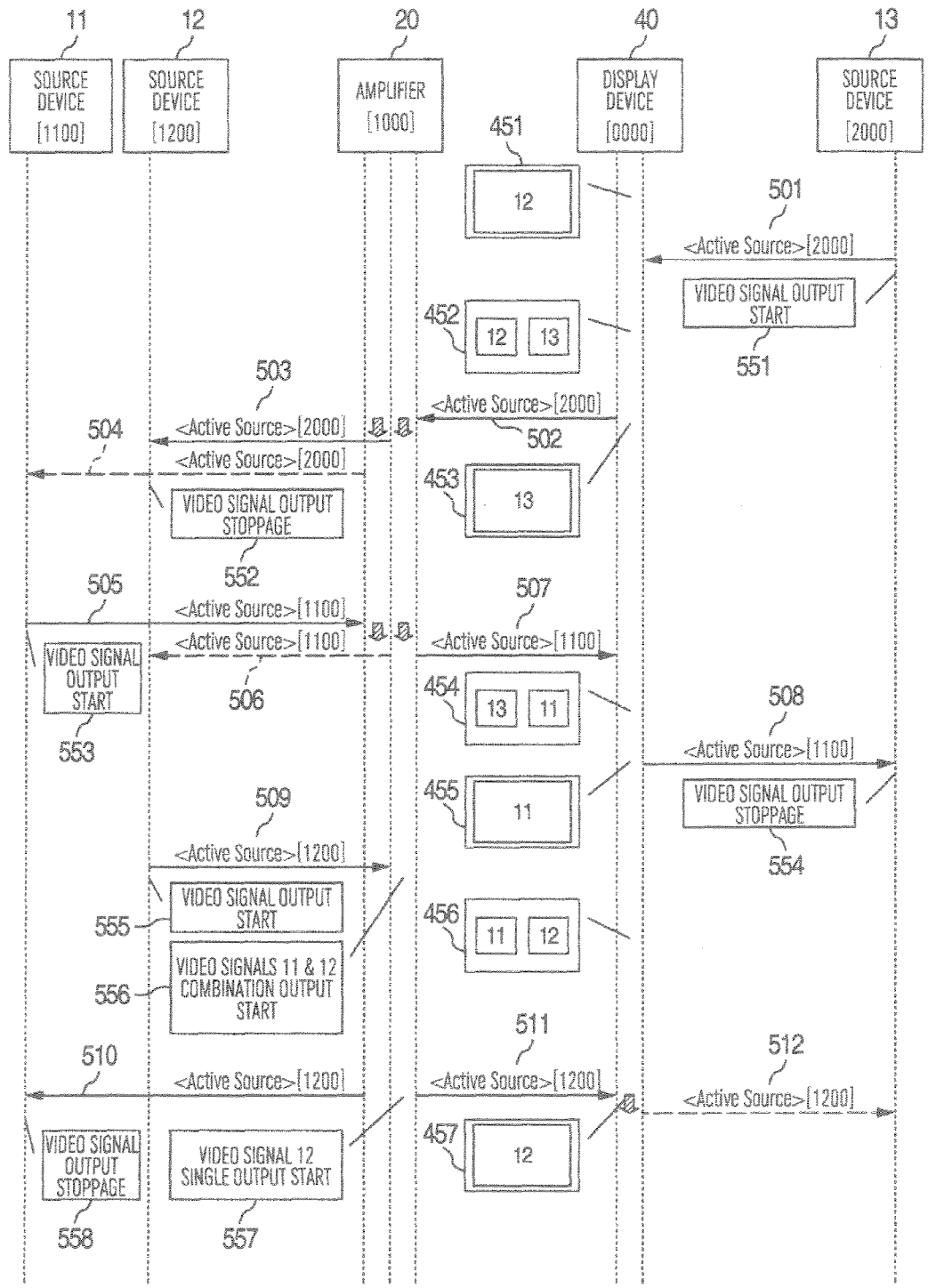
FIG. 6 illustrates one example of transmission and reception of a message in the video transmission system.

FIG. 6 illustrates one example of transmission and reception of the CEC message in the video transmission system of FIG. 4. Video switching of two or more source devices and multiple-screen display operations will be described below by using FIG. 6.

According to the HDMI specifications, the display device 40 acquires a physical address [0000], the audio amplifier 20 connected to a first HDMI terminal of the display device 40 acquires a physical address [1000], and the source device 13 connected to a second HDMI to final of the display device 40 acquires a physical address [2000]. The source devices 11 and 12 connected to HDMI input ports of the audio amplifier 20 acquire physical addresses [1100] and [1200], respectively.

In an initial state of FIG. 6, a video of the source device 12 s assumed to be supplied to the display device 40 through the audio amplifier 20 and displayed on a screen 451 of the display device 40.

Next, the source device 13 supplies to all of the devices (Broadcast) an active source [2000] 501 in which its own physical address is put to a CEC message for starting a video output. Since the CEC line in the HDMI terminal of the display device 40 is independent, only the display device 40 receives the CEC message. When the display device 40 causes the HDMI terminal having connected thereto the source device 13 to receive videos, the source device 13 starts (551) the video output. The display device 40 receives the video output from the source device 13, and performs a two-screen display mode as in a screen 452 as an image in which its image from the source device 13 is combined with that previously received from the source device 12.

When the display device 40 switches the video from the source device 13 over to a full-screen display mode as in a screen 453 from the two-screen display mode 452, the video output from the source device 12 is not required. To cope with the above problem, the CEC controller 412 within the display device 40 transfers the CEC message <active source> [2000] 501 sent by the source device 13 to the CEC controller 212 within the audio amplifier 20 as a CEC message <active source> [2000] 502.

The CEC controller 212 further transfers the CEC message <active source> [2000] 502 to the source device 12 as a CEC message <active source> [2000] 503, and the source device 12 stops (552) the image output. The CEC controller 212 may transfer the CEC message <active source> [2000] 502 also to the source device 11 as a CEC message <active source>

[2000] 504. However, since the source device 11 fails to output the video to the audio amplifier 20, a transfer for stopping the video output as an aim is not required.

Subsequently, the source device 11 sends a CEC message <active source> [1100] 505 for starting the video output. When the audio amplifier 20 causes the HDMI terminal having connected thereto the source device 11 to receive a video signal, the source device 11 starts (553) the video signal output. Since the CEC line in the HDMI terminal of the audio amplifier 20 is independent, the CEC controller 212 transfers a CEC message <active source> [1100] 507 to the display device 40.

The display device 40 causes the HDMI terminal having connected thereto the audio amplifier 20 to receive videos, and receives a video output from the source device 11 through the audio amplifier 20. Then, the display device 40 performs a two-screen display mode as in a screen 454 as an image in which the image output from the source device 11 is combined with that output from the source device 13. The CEC controller 212 may transfer he CEC message <active source> [1100] 505 also to the source device 12 as a CEC message <active source> [1100] 506. However, since the source device 12 fails to output the video to the audio amplifier 20, a transfer for stopping the video output as an aim is not required.

When the display device 40 switches the video from the source device 11 over to a full-screen display mode as in a screen 455 from a two-screen display mode 454, the video output from the source device 13 is not required. To cope with the above problem, the CEC controller 412 within the display device 40 transfers a CEC message <active source> [2000] 507 transferred by the audio amplifier 20 to the source device 13 as a CEC message <active source> [2000] 508, and as a result the source device 13 stops (554) the video output.

The source device 12 sends a CEC message <active source> [1200] 509 for starting the video output to all the devices. Then, the audio amplifier 20 causes the HDMI terminal having connected thereto the source device 12 to receive videos, and the source device 12 starts (555) the video signal output. The audio amplifier 20 receives a video signal also from the source device 12 in addition to the source device 11, and starts (556) supplying a two-screen combination video signal. Since no change occurs in the display device 40, it displays the two-screen combination video transmitted from the audio amplifier 20 on a screen 456.

The audio amplifier 20 moves (557) from the two-screen display mode to the full-screen display mode of videos from the source device 12. Then, the display device 40 which displays a video output from the audio amplifier 20 displays a video from the source device 12 on the full screen as illustrated in a screen 457. In the above-described state, since the video output from the source device 11 is not required, the CEC controller 212 within the audio amplifier 20 transfers a CEC message <active source> [1200] 509 transferred by the source device 12 to the source device 11 as a CEC message <active source> [1100] 510, and as a result the source device 11 stops (558) the video signal output.

The CEC controller 212 of the audio amplifier 20 transfers the CEC message <active source> [1200] to the display device 40 as a CEC message <active source> [1200] 511, and notifies the display device 40 that the video from the source device 12 is displayed on the full screen. The CEC controller of the display device 40 may transfer a CEC message <active source> [1200] 512 to the source device 13. However, since the source device 13 fails to output the video to the display device 40, a transfer for stopping the video output as an aim is not required.

For simplifying explanation, the description is made by using only the CEC message <active source>. Further, in order that each source device may issue the above message, device operations of a user and other CEC messages such as menu control and remote control code transfer may be used on the way.

Further, in place of the CEC messages 502, 503, 504, and 508 for the purpose of stopping the video signal output, the CEC message <active source> [0000] which means that the display device 40 uses a built-in signal source may be used. In a similar fashion, in place of the CEC messages 506, 507, 508, 510, 511, and 512, the CEC message <active source> [1000] which means that the audio amplifier 20 uses a built-in signal source may be used.

As described above, in a repeater such as an audio amplifier having a function of simultaneously receiving multiple videos and combining and outputting screens, both of two or more HDMI input ports and CEC lines in the HDMI output ports are caused to go independent. When a filtering process or delay process is appropriately performed during the CEC message transfer, a multiple-screen display mode such as a two-screen display mode can be realized at the same time.

A device which is not provided with a screen combination function, for example, the source device avoids the need to cause the CEC line to go independent, or respond to a new CEC message. Therefore, a special consideration is not required to realize the above function, and a user-friendly video transmission system having high backward compatibility can be built.

Figure 7:
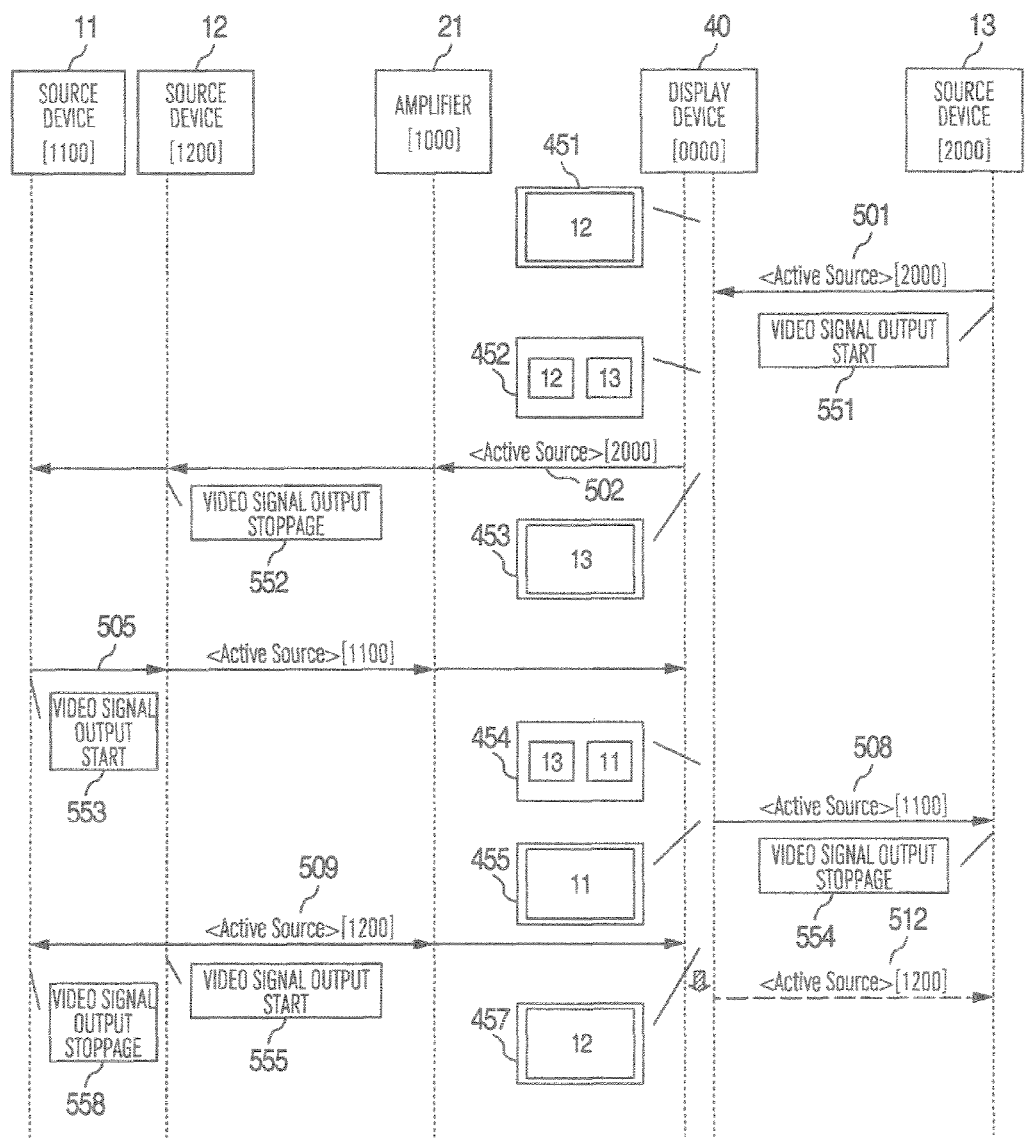
FIG. 7 illustrates one example of transmission and reception of the message in the video transmission system.

In addition, the backward compatibility on the audio amplifier will be further described. FIG. 7 illustrates operations of the case where a conventional audio amplifier 21 to which CEC lines are commonly-connected is substituted for the audio amplifier 20 of FIG. 6. The same reference numerals as those of FIG. 6 are given to the same components as in FIG. 6.

Processes of the display screens 451 to 455 of the display device 40 are the same as those of FIG. 6. FIG. 7 differs from FIG. 6 in the following points. That is, the CEC controller 412 transfers the CEC message <active source> [2000] 502 to the source devices 11 and 12 through the audio amplifier 21; however, the same display as in an example of FIG. 6 can be performed. Further, the source device 11 also transfers the CEC message <active source> [1100] 505 to the source device 12 and the display device 40 through the audio amplifier 21; however, the same display as in an example of FIG. 6 can be performed.

As compared with an example of FIG. 6, when the source device 12 issues the CEC message <active source> [1200] 509, the display device 40 changes the display. In FIG. 6, the display device 40 realizes the two-screen display mode 456 only when the audio amplifier 20 delays the message transfer. As compared the above, in FIG. 7, since the audio amplifier 21 which receives the above message performs an input switching operation, the display device 40 displays a switching display screen 457.

However, the audio amplifier 21 is a conventional device which is not provided with a screen combination function, and this operation can't be helped. With regard to every function except the above function, approximately the same functions are realized in FIGS. 6 and 7, and it is understood that high backward compatibility is adopted.

As described above, an example where the audio visual processing unit 213 combines two or more video signals is described. Further, the audio visual processing unit 213 can be similarly applied even when two or more videos are output so that video signals are not combined and supplied to the HDMI transmitter 221 as two or more video signals and the HDMI output port transmits a left eye video and right eye video of 3-D video format at the same time.

Further, the video transmission system may be configured so as to change a combination of videos and voices. For example, a video signal from the source device 11 may be combined with an audio signal from the source device 12 to produce the combined signal, which video signal and audio signal of the source devices 11 and 12 are used may be determined by default of each repeater or display device. Alternatively, <Active Audio Source> and <Active Video Source> may be defined as a new CEC message.

Third Embodiment

Figure 8:
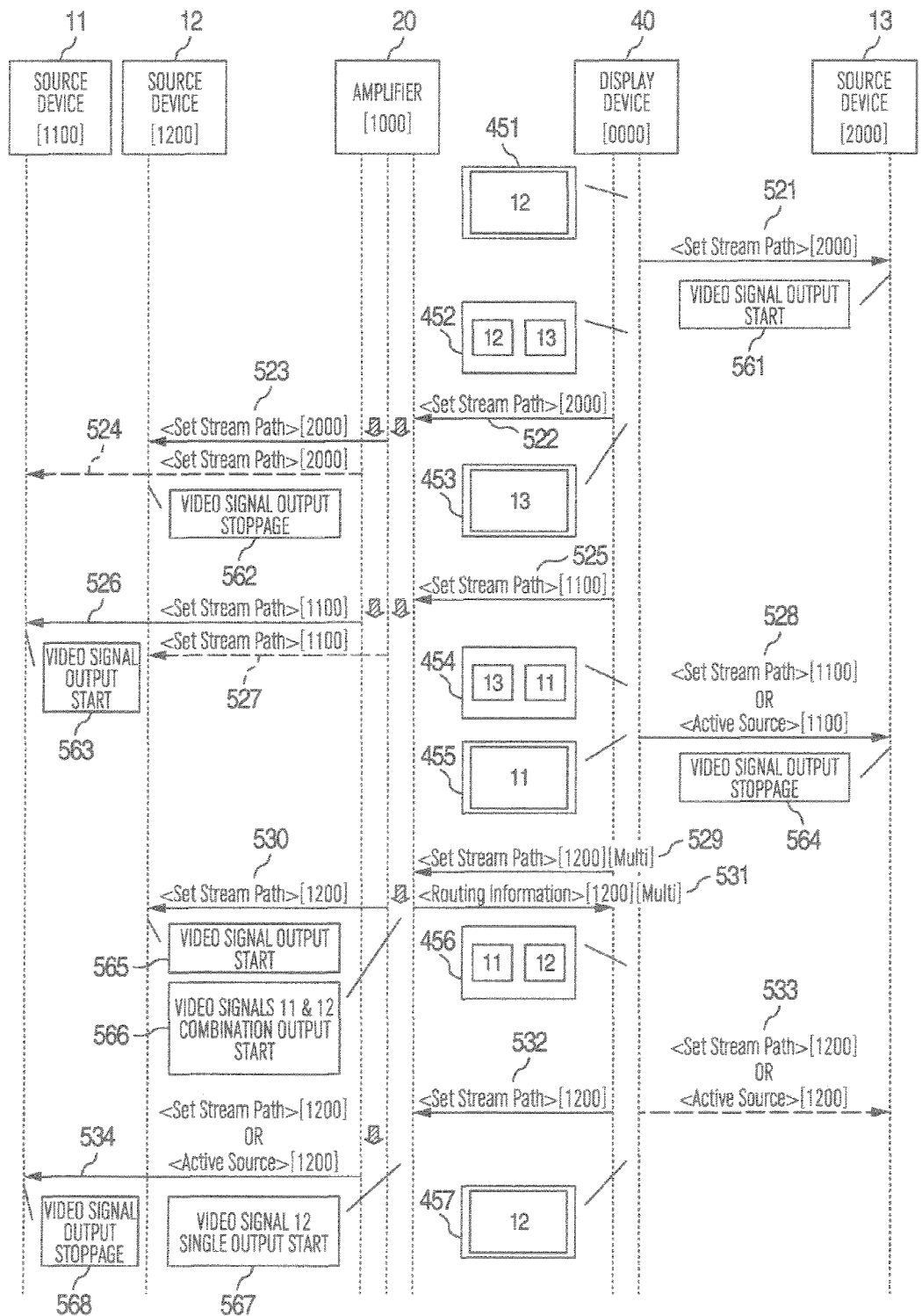
FIG. 8 illustrates one example of transmission and reception of the message in the video transmission system.

FIG. 8 illustrates one example of transmission and reception of the CEC message in the video transmission system of FIG. 4. In FIG. 6, each source device sends the CEC message <Active Source> for starting the video output, and starts the multiple-screen display mode. On the other hand, in FIG. 8, the display device 40 sends a request for starting the video output to each source device. The same reference numerals as those of FIG. 6 are given to the same components as in FIG. 6. Video switching of two or more source devices and multiple-screen display operations will be described below by using FIG. 8.

In the same manner as in FIG. 6, a video of the source device 12 is first displayed on the screen 451 of the display device 40.

Next, when the display device 40 sends to all the devices (Broadcast) the CEC message <Set Stream Path> [2000] 521 that the video is requested to be output to the source device 13, the source device 13 starts (561) the video output.

Since the CEC lines in the HDMI terminals of the display device 40 go independent, the above message 521 is not sent to the side of the audio amplifier 20. The video signal from the source device 12 is continuously supplied to the display device 40. The display device 40 performs the two-screen display mode as in the combined screen 452 of videos from the source devices 12 and 13.

When the display device 40 switches a video from the source device 13 over to the full-screen display mode as in the screen 453 from the two-screen display mode 452, a video output from the source device 12 is not required. To cope with the above problem, the CEC controller 412 within the display device 40 sends the CEC message <Set Stream Path> [2000] 522 to the CEC controller 212 within the audio amplifier 20.

The CEC controller 212 transfers the CEC message <Set Stream Path> [2000] 522 to the source device 12 as the CEC message <Set Stream Path> [2000] 523, and the source device 12 stops (562) the video output. Further, the CEC controller 212 may transfer the CEC message <Set Stream Path> [2000] 522 also to the source device 11 as the CEC message <Set Stream Path> [2000] 524. However, since the source device 11 fails to output the video to the audio amplifier 20, a transfer for stopping the video output as an aim is not required.

Subsequently, the display device 40 sends to all the devices (excluding the source device 13) the CEC message <Set Stream Path> [1100] 525 that the video output of the source device 11 is requested to be started. Then, the CEC controller 212 of the audio amplifier 20 transfers the CEC message <Set Stream Path> [1100] 525 to the source device 11 as the CEC message <Set Stream Path> [1100] 526. Similarly, the HDMI to final to which the source device 11 is connected is changed to be a video reception mode, and the source device 11 starts (563) the video signal output. The display device 40 receives videos output from the source device 11 through the audio amplifier 20, and performs the two-screen display mode as in the screen 454 as an image in which one image output from the source device 11 is combined with another image output from the source device 13. Further, the CEC controller 212 may transfer the CEC message <Set Stream Path> [1100] 525 also to the source device 12 as the CEC message <Set Stream Path> [1100] 527. However, since the source device 12 fails to output the video to the audio amplifier 20, a transfer for stopping the video output as an aim is not required.

When the display device 40 switches a video output from the source device 11 over to the full-screen display as in the screen 455 mode from the two-screen display mode 454, a video output from the source device 13 is not required. To cope with the above problem, the CEC controller 412 of the display device 40 sends to the source device 13 the CEC message <Set Stream Path> [1100] or <Active Source> [1100] 528 that since the source device 11 becomes a new video output source, the video output from the source device 13 may be stopped, and the source device 13 stops (564) the video output.

The display device 40 sends to the audio amplifier 20 the CEC message <Set Stream Path> [1200] [multi] 529 that two-screen display modes of the source devices 11 and 12 are requested to be started. The audio amplifier 20 changes the HDMI terminal having connected thereto the source device 12 to have a video reception mode, and sends to the source device 12 the display start requesting CEC message <Set Stream Path> [1200] 530 from which a [Multi] parameter is excluded. The source device 12 starts (565) the video signal output.

The audio amplifier 20 receives a video signal also from the source device 12 in addition to the source device 11, and starts (566) to output a two-screen combination video signal. The display device 40 receives the CEC response message <Routing Information> [1200] [Multi] 531 from the audio amplifier 20, and knows that the two-screen display signal is produced from the audio amplifier 20. The display device 40 displays this two-screen video on the screen 456.

The [Multi] parameter here used is newly added to the HDMI specifications. FIG. 10 illustrates a definition example of the CEC message. In the present embodiment, the [Multi] parameter is used as a parameter indicating the two-screen display mode. The video transmission system has a feature in which when the audio amplifier 20 excludes the [Multi] parameter during the CEC message transfer, even if the source device as a transfer destination is a device which fails to know a treatment of the above parameter, preferable compatibility connectivity can be maintained.

The [Multi] parameter is not additionally defined, and a <Set 2nd Stream Path> ["Physical Address"] or <2nd Routing Information> ["Physical Address"] may be newly defined and used as a new CEC message code.

When desiring to move from the two-screen display mode to the full-screen display mode of the video from the source device 12, the display device 40 sends the CEC message <Set Stream Path> [1200] 532 to the audio amplifier 20. As a result, the audio amplifier 20 starts to singly output (567) a video signal from the source device 12, and the full-screen display mode 457 of a video from the source device 12 is obtained. In this state, since the video output from the source device 11 is not required, the audio amplifier 20 sends to the source device 11 the CEC message <Set Stream Path> [1200] or <Active Source> [1200] 534, and stops (558) the video signal output from the source device 11.

The CEC controller of the display device 40 may issue to the source device 1 the CEC message <Set Stream Path> [1200] or <Active Source> [1200] 533. However, since the source device 13 fails to output the video to the display device 40, a transfer for stopping the video output as an aim is not required.

For simplifying explanation, the description is made by using only the CEC message <Set Stream Path> [1200]. Further, in order that the display device 40 may issue the above message, device operations of a user and other CEC messages (e.g., menu control and remote control code transmissions may be used on the way.

Further, in place of the CEC messages 522, 523, 524, and 528 for the purpose of stopping the video signal output, the CEC message <Active Source> [0000] which means that the display device 40 uses a built-in signal source may be used. In a similar fashion, in place of the CEC messages 526, 527, 528, 533, and 534, the CEC message <Active Source> [1000] which means that the audio amplifier 20 uses a built-in signal source may be used.

As described above, in a repeater such as an audio amplifier having a function of simultaneously receiving multiple images and outputting a combined image, both of two or more HDMI input ports and CEC lines in the HDMI output ports are caused to go independent. When a filtering process or delay process is appropriately performed during the CEC message transfer, the multiple-screen display ode such as the two-screen display mode can be realized at the same time.

Further, a device which is not provided with a screen combination function, for example, the source device avoids the need to cause the CEC line to go independent, or respond to a new CEC message. Therefore, a special consideration is not required to realize the above function, and a user-friendly video transmission system having high backward compatibility can be built.

Figure 9:
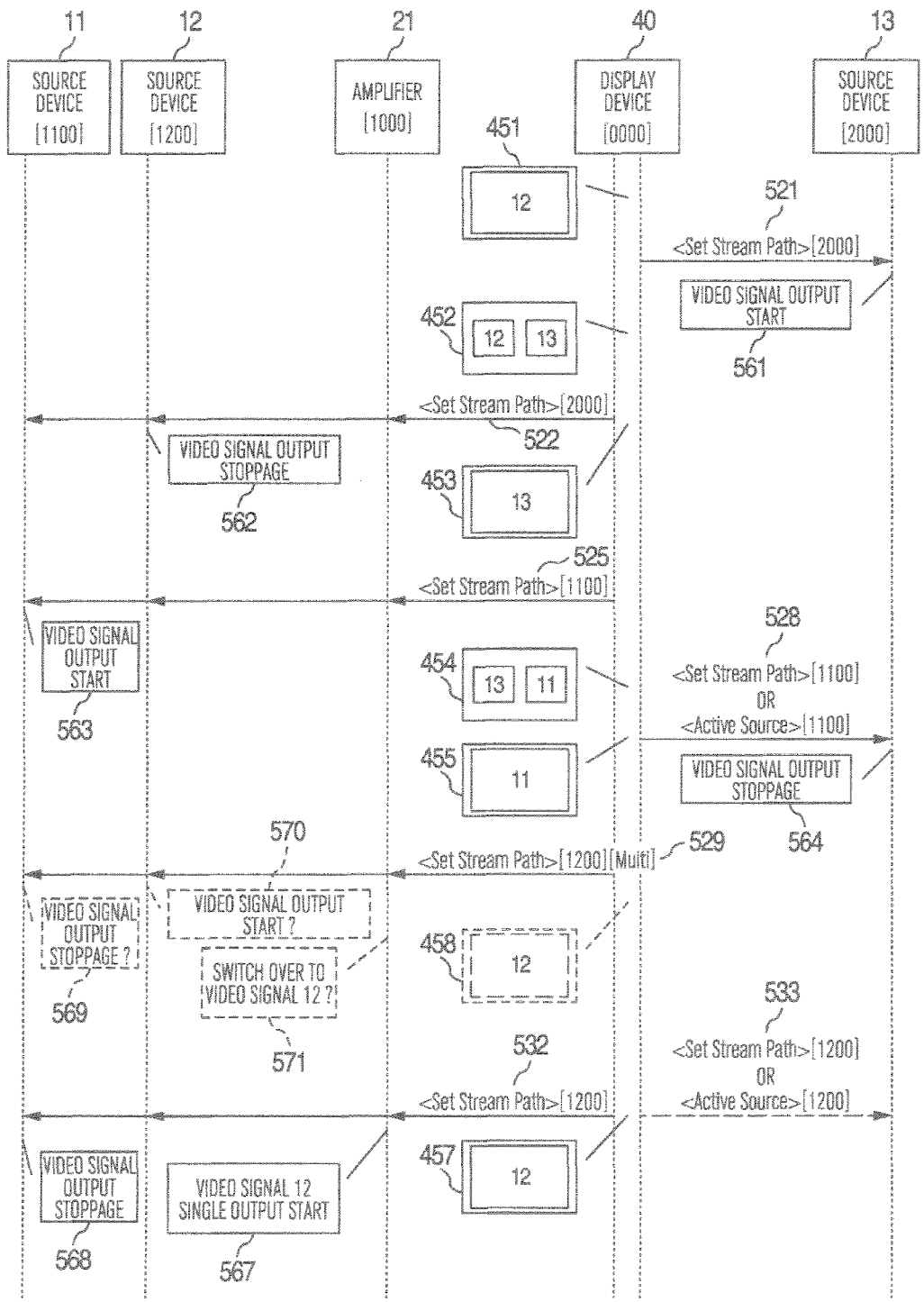
FIG. 9 illustrates one example of transmission and reception of the message in the video transmission system.

In addition, the backward compatibility on the audio amplifier will be described. FIG. 9 illustrates operations of the case where the conventional audio amplifier 21 to which the CEC lines are commonly-connected is substituted for the audio amplifier 20 of FIG. 8. The same reference numerals as those of FIG. 8 are given to the same components as in FIG. 8.

Processes of the display screens 451 to 455 of the display device 40 are the same as those of FIG. 8. FIG. 9 differs from FIG. 8 in the following points. That is, the CEC message <Set Stream Path> [1200] or <Set Stream Path> [1100] 525 sent by the display device 40 is transferred to the source devices 11 and 12 through the audio amplifier 21; however, an influence is not exerted on a screen display of the display device 40.

The display of the display device 40 changes as compared with an example of FIG. 8 when the display device 40 issues the CEC message <Set Stream Path> [1200] [Multi] 529. The display of the display device 40 changes depending on how the source devices 11 and and the audio amplifier 21 treat a newly-added [Multi] parameter.

When the added [Multi] parameter is ignored, the source device 12 starts (570) the video output, the audio amplifier 21 switches (571) the video input over to the source device 12, and the source device 11 stops (569) the video output. This process permits the video from the source device 12 to be displayed on the full screen as in the screen 458.

On the other hand, when the CEC message itself with an additional parameter is ignored, the screen fails to be switched over, and a state of the screen 455 in which the video output from the source device 11 is displayed on the full screen is maintained. When the audio amplifier 21 sends back <Routing Information> [1200] (not illustrated), whether the screen is switched over can be confirmed.

When the display device 40 issues the CEC message <Set Stream Path> [1200] 532, the screen 457 in which the video of the source device 12 is displayed on the full screen is obtained in the same manner as in FIG. 8.

The two-screen display mode 456 is realized in FIG. 8 only when a timing difference is provided on the CEC message <Set Stream Path> [1200] sent to the source devices 11 and 12 by the audio amplifier 20. As compared with FIG. 8, since the audio amplifier 21 of FIG. 9 is not provided with the above function, an operation for input switching is performed.

However, the audio amplifier 21 is a conventional device which is not provided with a screen combination function, and this operation can't be helped. With regard to every function except the above function, approximately the same functions are realized in FIGS. 6 and 7, and it is understood that high backward compatibility is adopted.

As described above, the audio visual processing unit 213 is described by taking the multiple-screen combination as an example. Further, the audio visual processing unit 213 can be similarly applied even when two or more videos are output so that screens are not combined and supplied to the HDMI transmitter 221 as two or more video signals and the HDMI output port simultaneously transmits a left eye video and right eye video of 3-D video format at the same time.

Further, a combination of videos and audios may be changed, for example, a video signal from the source device 11 may be combined with an audio signal from the source device 12 to produce the combined signal. Whether which video signal and audio signal of the source devices 11 and 12 are used may be determined by default of each repeater or display device. Alternatively, a <Set Audio Stream Path> or <Set Video Stream Path> may be defined as a new CEC message.

Fourth Embodiment

Figure 12:
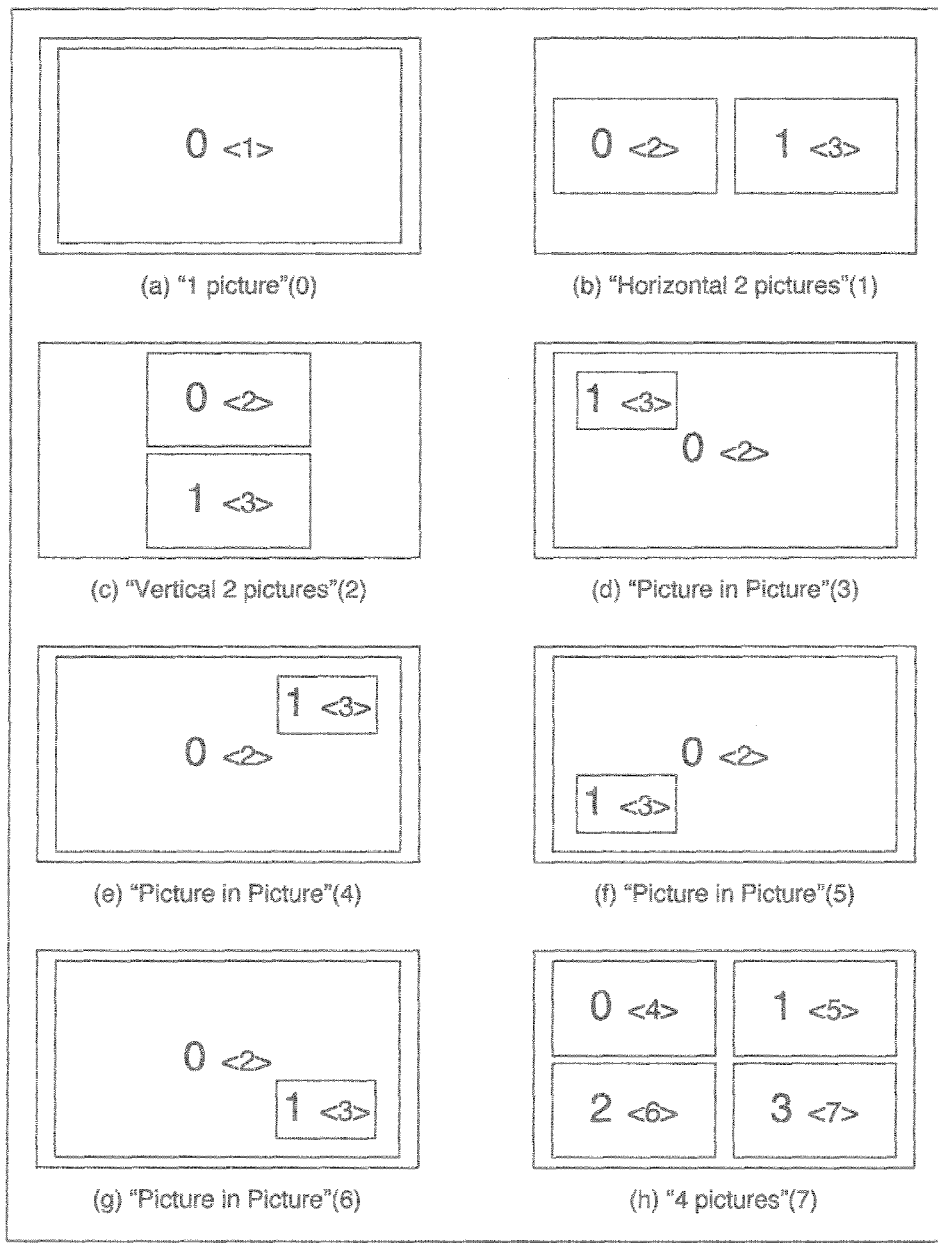
FIG. 12 illustrates one example of a multiple screen display transmission format in the video transmission system.

FIG. 11 illustrates an example in which an additional parameter [Multi] described in the third embodiment is expanded so as to respond to various combination screens, and FIG. 12 illustrates an example of the combination screen.

The [Multi] parameter includes a [Position] indicating a display position, a [Layout] indicating a screen combination method, a [3D format] indicating transmission of two independent 2D videos by using a 3D format, an [Audio mix] indicating an audio combining method, and a [Reserved] indicating a reserved area.

The [Layout] indicates eight types of screen combination methods illustrated in FIG. 12. A number in the figure indicates a "Position". A number without angle brackets falls into a left video, and a number with angle brackets falls into a right video during transmission in the 3D format. Further, "0" indicates a one-screen (=full-screen) display mode, "1" indicates a two-right-and-left-screen display mode, "2" indicates a two-upper-and-lower-screen display mode. "3" to "6" indicate an inserted sub-screen display mode, and a position of the sub-screen indicates upper left, upper right, lower left, and lower right. "7" indicates a four-screen display mode.

The [position] indicates a number illustrated in FIG. 12, for example, a left screen of the left side is defined to be "0" and a right screen of the right side is defined to be "1" in FIG. 12B in which two screens with the same size are aligned from side to side. When setting the [3D format] to "1", the left side of a left eye video indicates a [Position] of "0", the right side of a left eye video indicates a [Position] of "1", the left side of a right eye video indicates a [Position] of "2", and the right side of a right eye video indicates a [Position] of "4".

In the [Audio mix], "0" means that only voices of the selected source device are transmitted, "1" means that voices of the selected source device are combined and transmitted, "2" means that voices of the selected source device fail to be transmitted, and "3" means that all the audio signals of the source device in which video signals are output are transmitted.

Further, a case of the [Audio mix]="3" will be specifically described. In the HDMI specifications, since a linear pulse code modulation (LPCM) audio of eight channels can be transmitted, an audio channel is defined according to a [Position] parameter. For example, in the case of four screens or less, the audio channel is set to a stereo audio. The stereo audio added to videos of the [Position]="0" may be sequentially allocated to the audio channels of 0 and 1, and the stereo audio added to videos of the [Position]="1" may be sequentially allocated to the audio channels of 2 and 3.

In the case of more than four screens, the audio channel is set to a monaural audio. The monaural audio added to videos of the [Position]="0" may be sequentially allocated to the audio channel of 0, and the monaural audio added to videos of the [Position]="1" may be sequentially allocated to the audio channels of 1.

Except for the description method of FIG. 11, a parameter can be added and, for example, a size or position of an image during the screen combination can be specified. When providing for a case where an unsupported screen combination function is requested, an error code may be defined separately. Alternatively, when the above function is unsupported, a two-screen combination method considered to be nearer to it may be appropriately used, and further setting results may be sent back. Further, whether the above function can support what screen combination is previously inquired, and a message for responding the above inquiry may be additionally defined.

These features of the fourth embodiment permit useful screen combinations and voice transmissions to be realized from two or more video signals and audio signals.

Fifth Embodiment

Figure 13:
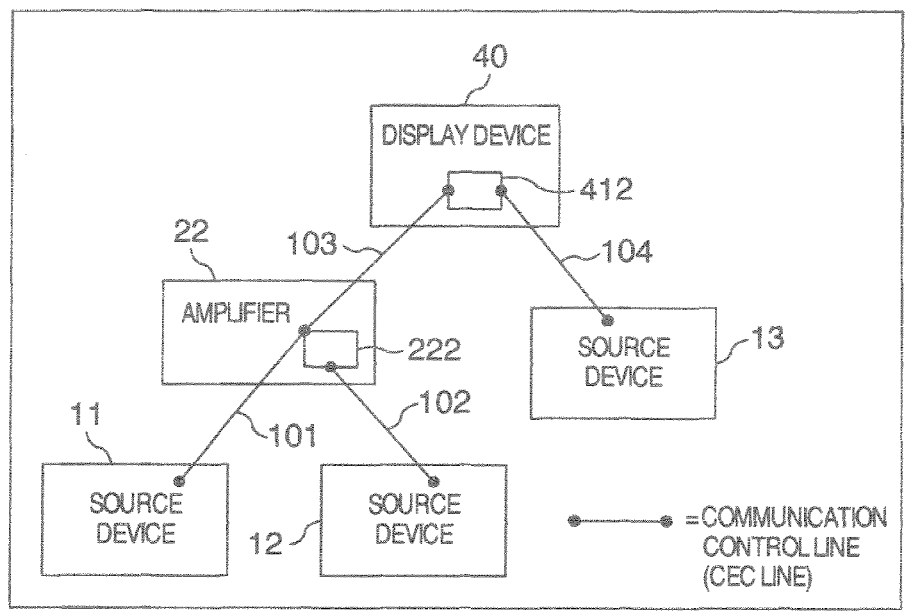
FIG. 13 is a block diagram illustrating a connection example of the control communication line in the video transmission system.

FIG. 13 is a block diagram illustrating a connection example of a control communication line for e video transmission system according to the present embodiment. FIG. 13 differs from FIG. 4 in that a CEC line 101 for the input and a CEC line 103 for the output of an audio amplifier 22 are connected to each other.

Figure 14:
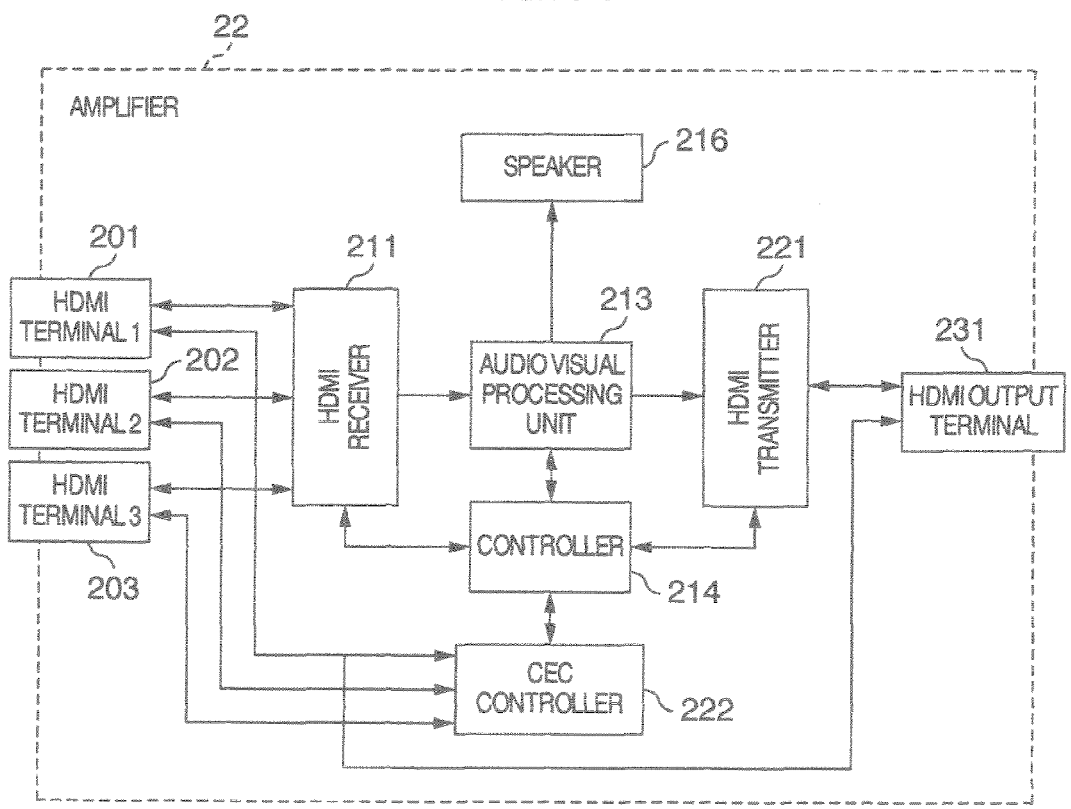
FIG. 14 is a block diagram illustrating a configuration example of the audio amplifier.

FIG. 14 is a block diagram illustrating a configuration example of the audio amplifier 22 of FIG. 13. FIG. 14 differs from FIG. 5 in the following points. That is, one CEC line connected to the HDMI output port 231 is connected to another CEC line of the HDMI (input) terminal 201, and the number of the CEC lines for connection of the CEC controller 222 is smaller by one than that of FIG. 5. When the number of CEC independent control lines is reduced, there is exerted an effect of not only reducing the number of terminals for LSI, but also reducing the number of transfer control lines to decrease a size of the CEC controller.

Figure 15:
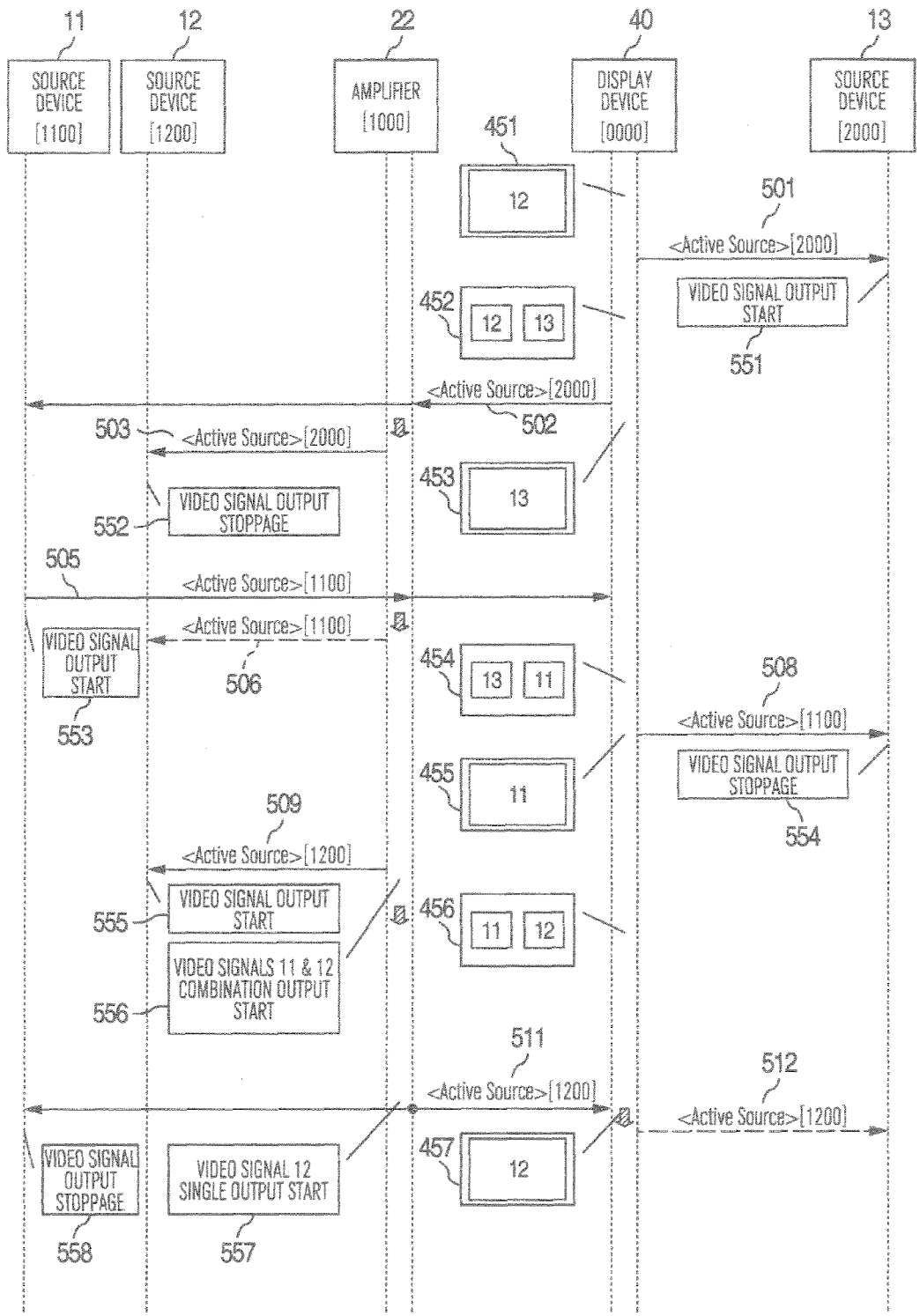
FIG. 15 illustrates one example of transmission and reception of the message in the video transmission system.

FIG. 15 illustrates one example of transmission and reception of the CEC message in the video transmission system of FIG. 13. The same reference numerals as those of FIG. 6 are given to the same components as in FIG. 6.

Processes of the display screens 451 to 457 of the display device 40 are the same as those of FIG. 6. FIG. 15 differs from FIG. 6 in the following points. That is, the CEC message <Active Source> [2000] 502 transferred by the CEC controller 412 is transferred to the source device 11 through the audio amplifier 22; however, an influence is not exerted on the screen display of the display device 40.

Further, FIG. 15 differs from FIG. 6 also in that the source device 11 sends the CEC message <Active Source> [1100] 505 to the display device 40 through the audio amplifier 22; however, an influence is not exerted on the screen display of the display device 40.

In FIG. 6, before saving the video from the source device 12 and moving to the screen 457 for displaying the video, the audio amplifier 20 sends the CEC messages <Active Source> [1200] 510 and 511 to the source device 11 and the display device 40, respectively. As compared with the above, in FIG. 15, the CEC lines connected to the source device 11 and the display device 40 are commonly-connected to the audio amplifier 22. Therefore, the CEC message <Active Source> [1200] 511 is sent to the source device 11 and the display device 40 at the same time. However, the above also fails to exert an influence on a fundamental operation within the video transmission system, and also on the screen display of the display device 40.

As can be seen from the above sequence, the video transmission system can realize a simultaneous display function of multiple screens more simply.

Sixth Embodiment

Figure 16:
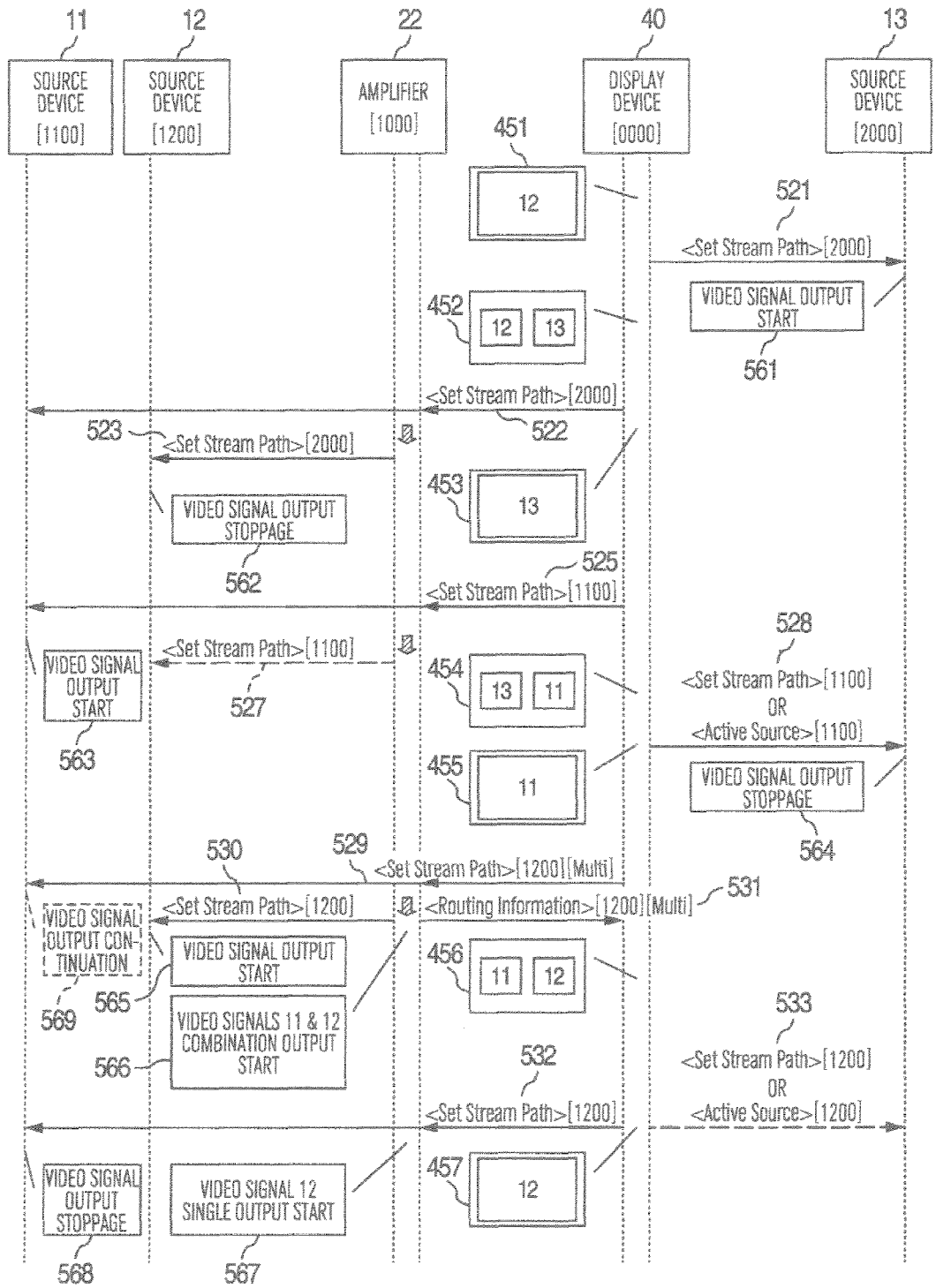
FIG. 16 illustrates one example of transmission and reception of the message in the video transmission system.

FIG. 16 illustrates one example of transmission and reception of the CEC message in the video transmission system of FIG. 13. The same reference numerals as those of FIG. 8 are given to the same components as in FIG. 8.

Processes of the display screens 451 to 457 of the display device 40 are the same as those of FIG. 6. FIG. 16 differs from FIG. 6 in the following points. That is, the CEC controller 412 sends the CEC messages <Set Stream Path> [2000] 522, <Set Stream Path> [1100] 525, and <Set Stream Path> [1200] 532 to the source device 11 through the audio amplifier 22; however, the above fails to exert an influence on the screen display of the display device 40 and the fundamental operation of the source devices 11 and 12.

Next, description will be made on operations of the source device 11 at a time when the CEC message <Set Stream Path> [1200] [Multi] 529 including a newly-added parameter [Multi] is supplied to the source device 11. When the source device 11 correctly interprets this message including the new parameter [Multi], or ignores the message itself, it operates without problems in the same manner as in FIG. 6. However, there is a problem that when only the new parameter [Multi] is ignored, a video signal is interpreted to be switched over and the video signal output (569) is not maintained, and stopped.

For providing for a stop of the video signal output, the audio amplifier 22 includes a detector which detects a stop of the video signal output. When the video signal output is determined to be stopped, the video output from the source device 12 is changed from the two-screen display mode to the full-screen display mode so that a black screen with no video can be prevented from being displayed.

As cited in the description of the third embodiment, the [Multi] parameter is not additionally defined, and CEC messages <Set 2nd Stream Path> ["Physical Address"] and <2nd Routing Information> ["Physical Address"] may be newly defined as a new CEC message code. The video transmission system has a feature in which when defining the new message, since the source device failing to respond to the new [Multi] parameter ignores the new message more securely, the above-described problem is solved.

As described above, a repeater is described by taking the audio amplifier as an example. When the present embodiment is applied to a video device having a video output port and two or more video input ports such as a video combination device, a recorder, and a set top-box, the same effect can be exerted.

Seventh Embodiment

Figure 17:
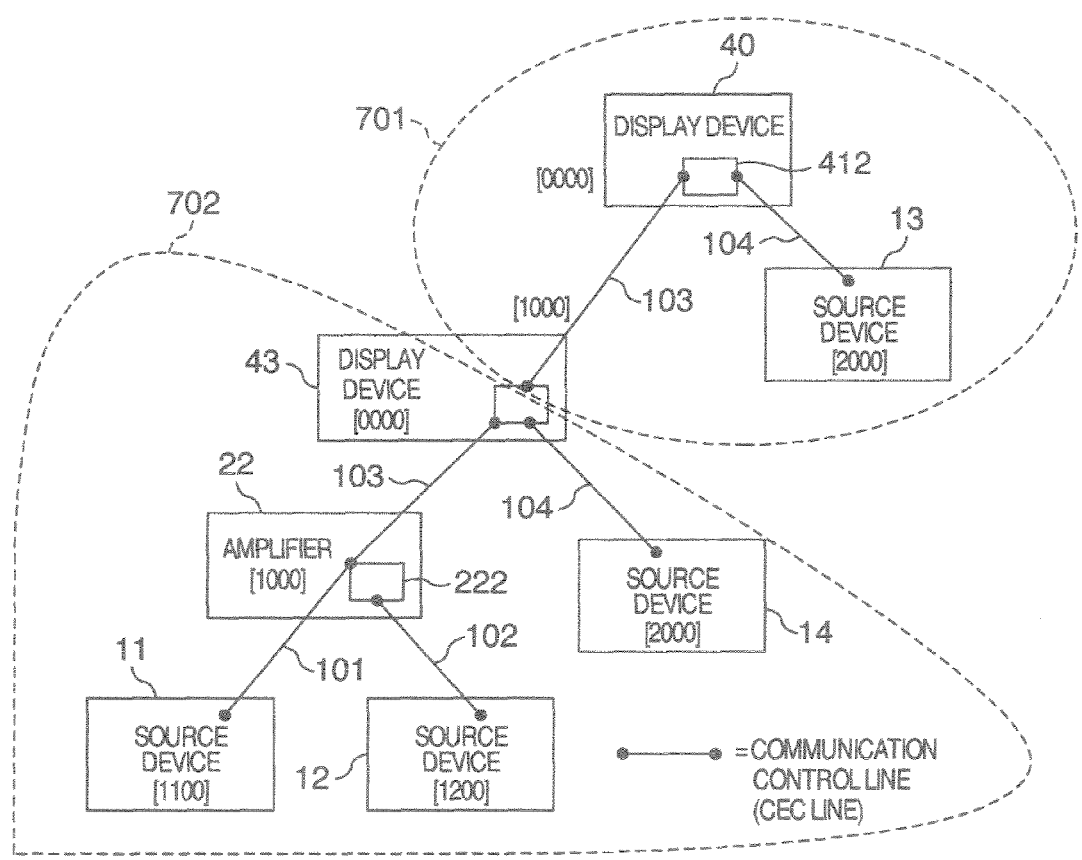
FIG. 17 is a block diagram illustrating a connection example of the control communication line in the video transmission system.

FIG. 17 is a block diagram illustrating a connection example of a control communication line for the video transmission system according to the present embodiment. FIG. 17 differs from FIG. 13 in that another display device 43 is connected between the display device 40 and the audio amplifier 22. The display device 43 is further connected to another source device 14. A bracket [xxxx] represents a physical address defined by the HDMI specifications. There are formed a CEC network 701 in hick the display device 40 is set to a root address [0000] of the physical address and a CEC network 702 in which the display device 43 is set to a root address [0000] of the physical address.

FIG. 20 is a table illustrating a contrast example of the physical address and the logical address in the CEC network of FIG. 17. A substantial physical address and logical address are acquired based on the definition of the HDMI in each of the CEC networks 701 and 702. On the assumption of an integrated network of the CEC networks 701 and 702, a visual physical address and logical address are assumed by devices within each CEC network for cooperation control.

The visual physical address of the video device of the CEC network 702 viewed from the CEC network 701 is obtained by copying the physical address belonging to the CEC network 702 into a portion "000" (three digits from right) of the physical address of the output port of the display device 43 as a device relating to the physical address [1000] of the output port of the display device 43. The visual physical address of the video device of the CEC network 701 viewed from the CEC network 702 has the same [0000] as that of the display device 43. The video device is treated as an internal device of the display device 43.

As the visual logical address of the video device of the CEC network 702 viewed from the CEC network 701, the logical address belonging to the CEC network 702 is used. However, a "4" Playback 1 already acquired by the source device 13 is not redundantly used. Therefore, a "8" Playback 2 and a "11" Playback 3 are used in the source devices 11 and 12, respectively. Since no logical address can be acquired in the source device 14, a "15" Unregistered is used. The visual logical address of the video device of the CEC network 701 viewed from the CEC network 702 is assumed to be the same "0" TV as that of the display device 43.

The display device 43 stores the above-described reference table. Further, In a message exchange between the CEC networks 701 and 702, conversion between the physical address and the logical address is performed during the filtering, transfer, and conversion transfer operations of the messages.

Figure 18:
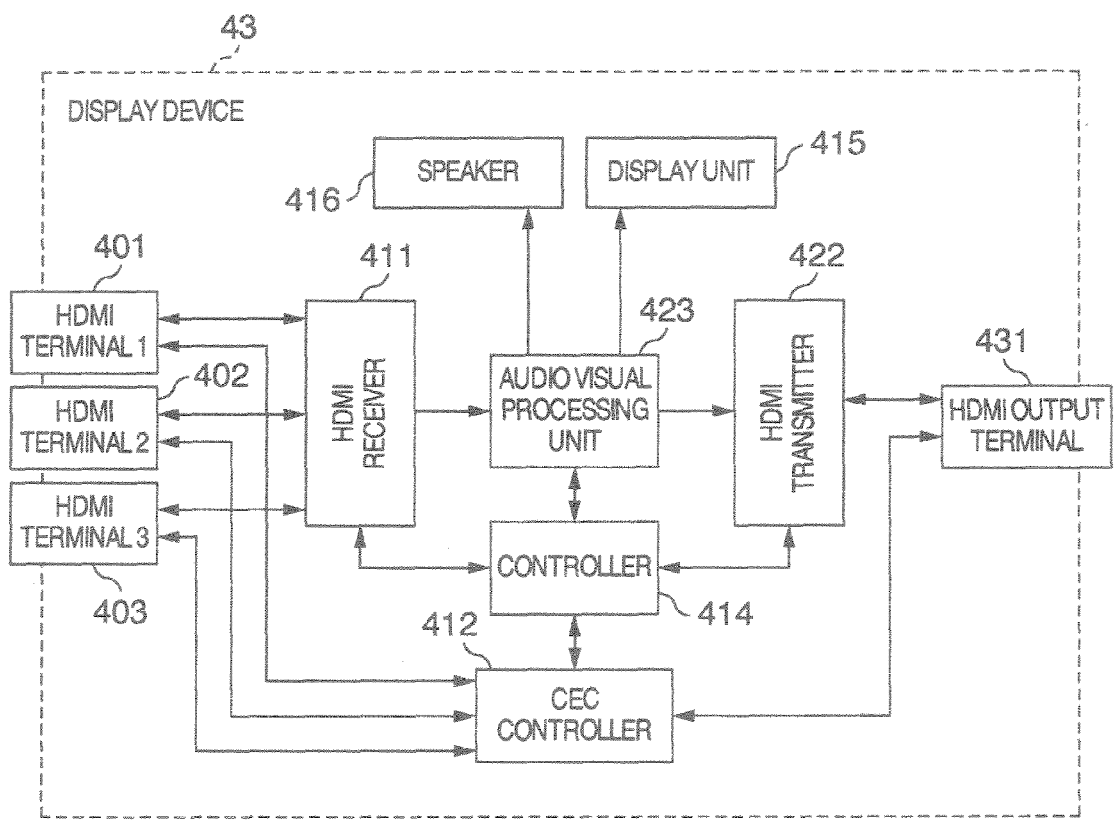
FIG. 18 is a block diagram illustrating a configuration example of the display device.

FIG. 18 is a block diagram illustrating a configuration example of the display device 43 illustrated in FIG. 17. FIG. 18 differs from FIG. 2 in the following points. That is, the audio visual processing unit 423 separates or selectively outputs one screen portion from a combination video stream or two or more video streams, and transmits it from the HDMI transmitter 422 through the HDMI output port 431 to another display device (not illustrated). Further, the CEC line in the output port 431 is connected to the CEC controller 412. The antenna and broadcast receiving processing unit of FIG. 2 are omitted. The display device 43 of FIG. 18 has the same configuration as that in which the display unit 415 is provided on the audio amplifier 20 of FIG. 5.

Figure 19:
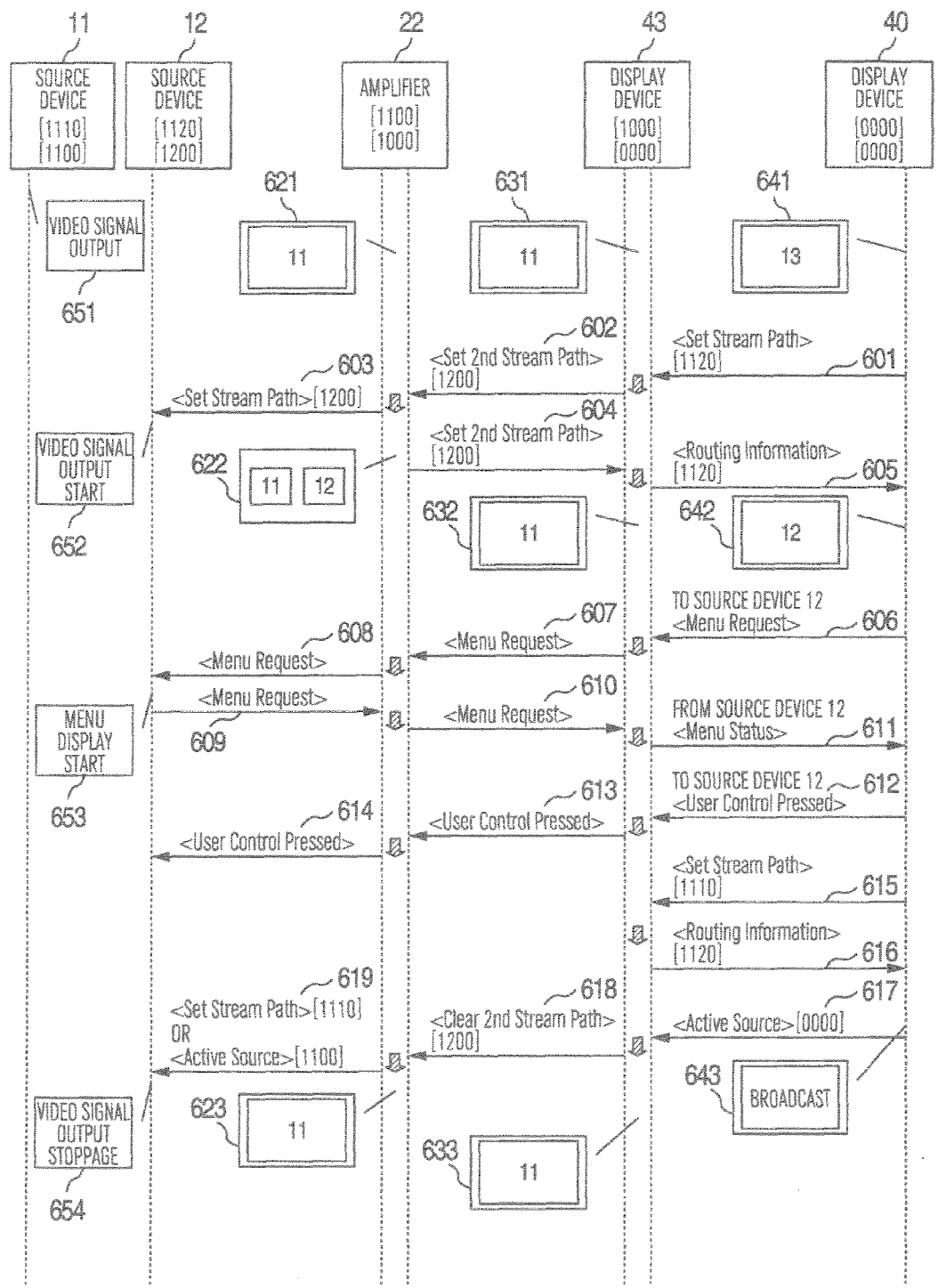
FIG. 19 illustrates one example of transmission and reception of the message in the video transmission system.

FIG. 19 illustrates one example of transmission and reception of the CEC message in the video transmission system of FIG. 17. First, the source device 11 outputs (651) the video signal. The audio amplifier 22 selects and outputs the video signal (621), and then the display device 43 displays it on a screen 631. The display device 40 receives a video output from the source device 13, and displays it on a screen 641.

A user operates so as to display videos from the source device 12 on the display device 40. Then, the display device 40 sends to the display device 43 a CEC message <Set Stream Path> [1120] 601 that the video output from the source device 12 is requested. The display device 43 converts the received CEC message 601 into a new CEC message <Set 2nd Stream Path> [1200] that the second video output described in the third embodiment is requested, and sends the converted CEC message to the audio amplifier 22.

The audio amplifier 22 exchanges the sent CEC message into the normal source device selection request CEC message <Set Stream Path> [1200] 603, and sends it to the source device 12. Further, the audio amplifier 22 sends back to the source device 43 the CEC message <2nd Routing Information> [1200] 604 that the second video output is notified. Further, the display device 43 sends back to the display device 40 the CEC message <Routine Information> [1120] 605 that the video from the source device 12 is output.

The source device 12 which receives the above source device selection request message 603 starts (652) the video signal output. The audio amplifier 22 supplies video signals from the source devices 11 and 12 to the display device 43 while combining screens or using a 3D video transmission format. The display device 43 extracts a video signal to be displayed by itself of the source device 11 from two or more video signals, and displays it as in the screen 632. Further, the display device 43 extracts the video from the source device 12, and supplies the video to the display device 40. Then, the display device 40 displays the video from the source device 12 as in the screen 642.

When controlling the source device 12, the display device 40 sends to the display device 43 the CEC message <Menu Request> 606 that a menu display is requested. Then, the display device 43 transfers to the audio amplifier 22 the CEC message <Menu Request> 607 that the logical address in a destination of a header is converted referring to the reference table of FIG. 20. The audio amplifier 22 transfers the transferred CEC message to the source device 12 as the CEC message <menu request> 608.

The source device 12 starts (653) the menu display, and sends back to the audio amplifier 22 the CEC message <Menu Status> 609 that a menu display state is notified. The audio amplifier 22 transfers the above CEC message to the display device 43 as the CEC message <Menu Status> 610. Since this CEC message is sent back from the source device 12 which supplies the video to the display device 40, the display device 43 determines that it is sent back to the display device 40. Further, the display device 43 transfers the above CEC message to the display device 40 as the CEC message <Menu Status> 611.

Since the menu display is prepared, the display device 40 sends to the display device 43 the CEC message <User Control Pressed> 612 that a predetermined remote control code is notified through a remote control operation of the user. After performing a process such as a destination conversion, the display device 43 transfers the above CEC message to the audio amplifier 22 as the CEC message <User Control Pressed> 613. Further, the audio amplifier 22 transfers the CEC message <User Control Pressed> 614 to the source device 12. This process permits the user to realize the menu selection operation.

The display device 40 sends to the display device 43 the CEC message <Set Stream Path> [1110] 615 that the video from the source device 11 is requested. The display device 43 itself displays the video from the source device 11, and therefore sends back to the display device 40 the CEC message <Routing Information> [1120] 616 which represents a current video transmission route maintenance or the CEC message <Feature Abort> which represents that the video from the source device 11 cannot be transmitted.

At this time, when the display device 40 can receive the video format received by the display device 43, the display device 43 may send back to the display device 40 the CEC message <Routing Information> [1110] (not illustrated) which represents that the video from the source device 11 is switched over according to the instruction, and may transmit the video signal from the source device 11 to the display device 40.

When switching over to the broadcast as the reception display (643) by using a built-in tuner, the display device 40 notifies the display device 43 that the video output from the source device 12 is not required, for example, by using the CEC message <active source> [0000] 643. The display device 43 stops an operation of extracting the video of the source device 12 from the videos received from the audio amplifier 22 and transmitting the extracted video to the display device 40. At the same time, the display device 43 sends to the audio amplifier 22 the new CEC message <Clear 2nd Stream Path> [1200] 618 which notifies it that the video from the source device 12 is not required to be combined and transmitted.

The audio amplifier 22 aborts the combination video transmission. Further, the audio amplifier sends to the source device 12 the CEC message <Set Stream Path> [1100] or <Active Source> [1100] which notifies it that the video from the source device 12 is not required. The source device 12 then stops (654) the video signal output.

The video signal described in the present embodiment indicates a video and audio signal to which an audio signal belongs. In the above-described example, the display device 43 extracts the video and audio signal and transmits it to the display device 40. Further, the display device 43 may extract only the video signal or only the audio signal, and transmit it to the display device 40.

Through the above-described processes, the display devices 40 and 43 can arbitrarily display videos from the same source device. When failing to performing their processes, each source device or a repeater such as an audio amplifier is required to have two or more video outputs for the display devices 40 and 43 and independent CEC control. In addition, a special source device is required to be prepared. Further, the connection cable between devices approximately doubles. According to the present embodiment, an effect capable of solving the above botheration is exerted.

In the above description, a display device and an audio amplifier as a repeater are described by using an example; however, it is not limited thereto. When the repeater has an output port and two or more input ports, the present embodiment is applicable to the video transmission system.

Further, the description is made on the premise of the wired connection, and further even if wireless connection is performed, the present invention exerts the above effect. The proposed video transmission system has a feature in which in the wireless connection, the number of channels to be used is saved in place of the number of cables.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display system comprising:
    a first source device configured to output a first video signal;
    a second source device configured to output a second video signal; and
    a display device connected to the first and second source devices, wherein:
    when a multiple-screen display mode is performed, if the display device receives a message for starting an output of the second video signal from the second source device, the display device does not transfer the message to the first source device, and
    when the multiple-screen display mode is not performed, if the display device receives a message for starting the output of the second video signal from the second source device, the display device transfers the message to the first source device.

2. The display system according to claim 1, wherein the first source device is configured to stop an output of the first video signal upon receiving a message for starting the output of the second video signal from the display device.

3. A display device configured to receive a first video signal from a first source device and a second video signal from a second source device, wherein:
    when a multiple-screen display mode is performed, if the display device receives a message for starting an output of the second video signal from the second source device, the display device does not transfer the message to the first source device, and
    when the multiple-screen display mode is not performed, if the display device receives the message for starting the output of the second video signal from the second source device, the display device transfers the message to the first source device.

4. A repeater configured to receive a first video signal from a first source device, a second video signal from a second source device, and output the first video signal and the second video signal to a display device, wherein:
    when a multiple-screen display mode is performed, if the display device receives a message for starting the output of the second video signal from the second source device, the display device does not transfer the message to the first source device, and
    when the multiple-screen display mode is not performed, if the display device receives the message for starting the output of the second video signal from the second source device, the display device transfers the message to the first source device.

* * * * *